US009708927B2

(12) United States Patent
Hatcher, Jr. et al.

(10) Patent No.: US 9,708,927 B2
(45) Date of Patent: Jul. 18, 2017

(54) OPTICAL BASED SYSTEM AND METHOD FOR MONITORING TURBINE ENGINE BLADE DEFLECTION

(71) Applicant: Siemens Energy, Inc., Orlando, FL (US)

(72) Inventors: Clifford Hatcher, Jr., Orlando, FL (US); Raymond S. Nordlund, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 493 days.

(21) Appl. No.: 14/326,494

(22) Filed: Jul. 9, 2014

(65) Prior Publication Data

US 2016/0010496 A1 Jan. 14, 2016

(51) Int. Cl.
*G01M 15/14* (2006.01)
*F01D 21/06* (2006.01)
*F01D 21/00* (2006.01)

(52) U.S. Cl.
CPC ........... *F01D 21/06* (2013.01); *F01D 21/003* (2013.01); *F05D 2240/304* (2013.01); *F05D 2270/8041* (2013.01)

(58) Field of Classification Search
USPC ........................................................ 73/112.01
See application file for complete search history.

(56) References Cited

U.S. PATENT DOCUMENTS 4,887,468 A 12/1989 McKendree
6,494,046 B1 12/2002 Hayess
7,064,811 B2 * 6/2006 Twerdochlib .................. 356/24
7,409,854 B2 8/2008 Teolis
8,151,647 B2 * 4/2012 Twerdochlib .................. 73/661
8,413,493 B1 * 4/2013 Polywoda, III ....... G01M 15/14 73/112.01
9,530,209 B2 * 12/2016 Hatcher, Jr. ............. G06T 7/004
2004/0051525 A1 * 3/2004 Hatcher ............... G01N 27/902 324/262
2005/0199832 A1 * 9/2005 Twerdochlib ........... F01D 5/005 250/559.29
2005/0270519 A1 * 12/2005 Twerdochlib ......... F01D 21/003 356/24
2006/0078193 A1 * 4/2006 Brummel ........... G01N 21/8806 382/152
2007/0132840 A1 * 6/2007 Konomura ........... G01N 21/954 348/65

(Continued)

*Primary Examiner* — Eric S McCall

(57) ABSTRACT

An optical based system and method for monitoring turbine engine blade deflection during engine operation. An optical camera is coupled the exterior of an engine inspection port, so that its field of view captures images of a rotating turbine blade, such as the blade tip. The camera's image capture or sampling rate matches blade rotation speed at the same rotational position, so that successive temporal images of one or more blades show relative movement of the blade tip within the image field of view. The captured successive images are directed to a blade deflection monitoring system (BDMS) controller. The controller correlates change in a blade's captured image position within the camera field of view between successive temporal images with blade deflection. The BDMS alarms or trips engine operation if the monitored blade deflection falls outside permissible operation parameters.

16 Claims, 2 Drawing Sheets

(56) References Cited

U.S. PATENT DOCUMENTS

| | | | | | |
|---|---|---|---|---|---|
| 2010/0074727 | A1* | 3/2010 | Twerdochlib | G01H 1/006 | 415/118 |
| 2011/0135466 | A1* | 6/2011 | Latorre | F03D 7/02 | 416/1 |
| 2012/0101775 | A1* | 4/2012 | Mitchell | F01D 21/003 | 702/183 |
| 2012/0296593 | A1 | 11/2012 | Seccombe | | |
| 2013/0115050 | A1* | 5/2013 | Twerdochlib | F01D 21/14 | 415/118 |
| 2013/0135457 | A1* | 5/2013 | Kell | F01D 25/285 | 348/82 |
| 2013/0194379 | A1 | 8/2013 | Baleine | | |
| 2013/0335530 | A1* | 12/2013 | Hatcher, Jr. | G02B 23/2484 | 348/46 |
| 2013/0335549 | A1* | 12/2013 | Hatcher, Jr. | G02B 23/2484 | 348/82 |
| 2014/0055596 | A1* | 2/2014 | Hatcher, Jr. | B25J 9/065 | 348/82 |
| 2014/0063227 | A1* | 3/2014 | Baleine | G02B 23/2492 | 348/82 |
| 2014/0271181 | A1* | 9/2014 | Perley | F03D 7/042 | 416/1 |
| 2015/0092039 | A1* | 4/2015 | Ruhge | G01B 21/16 | 348/82 |
| 2015/0199805 | A1* | 7/2015 | Hatcher, Jr. | G06T 7/004 | 348/135 |
| 2015/0252789 | A1* | 9/2015 | Bunge | F03D 17/00 | 382/107 |
| 2015/0300920 | A1* | 10/2015 | DeAscanis | G01M 15/14 | 356/614 |
| 2016/0177776 | A1* | 6/2016 | Ruhge | F01D 11/006 | 73/112.01 |

* cited by examiner

OPTICAL BASED SYSTEM AND METHOD FOR MONITORING TURBINE ENGINE BLADE DEFLECTION

BACKGROUND OF THE INVENTION

1. Field of the Invention

The invention relates to turbine engine, such as industrial gas turbine engine or steam turbine engine blade deflection monitoring systems, utilizing an optical camera to capture time-based images of blade position, such as blade tip position. Changes in blade position over time are correlated to blade deflection, which in turn is used by the monitoring system to alarm or stop turbine engine operation if the correlated parameter is out of a permissible operating parameter range.

2. Description of the Prior Art

Industrial turbine engines, such as steam or combustion turbine engines, utilize shaft mounted rotating turbine blades to generate mechanical work, such as for driving an electric generator in a power generation plant and/or compressing air for combustion in a combustion turbine. The compressor or turbine section blades are susceptible to deflection during turbine engine operation, for example due to inlet compression or combustion gas transients or steam backpressure. Permissible blade deflection parameters are often established by turbine engine manufacturers and operators in order to reduce risk of engine damage. An engine blade deflection monitoring system is often employed during new or serviced engine validation to confirm that the engine is operating within permissible blade deflection parameters. In some engine installations a blade deflection monitoring system remains online during some or all engine operation.

Some known turbine engine blade deflection monitoring systems utilize vibration sensors coupled to the engine housing and/or turbine shaft structure to monitor frequency and/or amplitude, which is indirectly attributed to blade deflection. Other known turbine engine blade deflection monitoring systems directly monitor deflection amplitude of one or more individual blades. In some known systems individual blades incorporate strain gauges that measure blade deflection. Other known systems utilize proximity-type sensors that determine one or more blade positions relative to one or more of the proximity sensors. Changes in relative blade position over time are correlated to blade deflection amplitude. Proximity sensors incorporated in individual blade vibration and deflection monitoring systems have included ultrasonic, eddy current, laser and capacitive modality sensors. Individual blade monitoring proximity-type sensors are mounted within the turbine engine internal cavities, where they are exposed to hostile high pressure steamed or combustion gas environments. Exposure of internal sensors to the engine interior's hostile environment increases likelihood that the monitoring system may not remain operational during the entire operating cycle between scheduled maintenance cycles.

SUMMARY OF THE INVENTION

Exemplary embodiments of the invention are directed to an optical image based system and method for monitoring turbine engine (such as industrial combustion or steam turbine engine) blade deflection during engine operation. An optical camera is coupled the exterior of an engine inspection port, with its optical image gathering lens components oriented so that its field of view is oriented within the engine and captures images of a rotating turbine blade, such as the blade tip. The camera's image capture or sampling rate matches blade rotation speed, so that successive temporal images of one or more blades taken at the same rotational position within the engine are directed to a blade deflection monitoring system (BDMS) controller. The controller correlates changes in a blade's captured image position within the camera field of view between successive temporal images taken at the same blade rotational position with blade deflection. The BDMS controller alarms or trips engine operation if the monitored blade deflection falls outside permissible operation parameters. By mounting the camera outside the engine, fewer monitoring system components are exposed to the hostile operating environment within the engine, increasing likelihood that the system will remain operational until the next scheduled maintenance cycle.

Some exemplary embodiments of the invention feature a method for monitoring turbine blade deflection during turbine engine operation by establishing an optical camera field of view within an operating turbine engine that captures optical images of at least a portion of a turbine blade at a rotational position. A first image of the turbine blade portion in the field of view is captured at the rotational position. A second image of the turbine blade portion in the field of view is captured at the same rotational position at a later time. Change in relative position of the turbine blade portion within the field of view between the first and second images is determined. The determined change in the turbine blade portion relative position is correlated with the turbine blade deflection.

Other exemplary embodiments of the invention feature an operating turbine engine blade deflection monitoring system, including an optical camera having a field of view. The camera is adapted for coupling to an operating turbine engine, so that its field of view captures optical images of at least a portion of a turbine blade at a rotational position within the turbine engine. The camera is capable of capturing a first image of the turbine blade portion in the field of view at the rotational position and capturing a second image of the turbine blade portion in the field of view at the same rotational position at a later time. A blade deflection monitoring system controller is coupled to the camera, for receiving the first and second images and determining change in relative position of the turbine blade portion within the field of view between the first and second images. The controller correlates the determined change in the turbine blade portion relative position with the turbine blade deflection.

Additional exemplary embodiments of the invention feature a turbine engine, having a housing defining an inspection port; a rotating shaft in the housing, having an array of turbine blades; and a turbine engine blade deflection monitoring system. The blade deflection monitoring system includes an optical camera having a an optical tube, coupled to the inspection port, so that a field of view through the optical tube generates images of at least a portion of a turbine blade at a rotational position within the turbine engine housing, with image capture components of the camera remaining outside the engine. The camera is capable of capturing a first image of the turbine blade portion in the field of view at the rotational position and capturing a second image of the turbine blade portion in the field of view at the same rotational position at a later time. A blade deflection monitoring system controller is coupled to the camera, for receiving the first and second images and determining change in relative position of the turbine blade portion within the field of view between the first and second images.

The controller correlates the determined change in the turbine blade portion relative position with the turbine blade deflection.

The respective features of the invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will realize that the teachings of the embodiments of the invention can be readily utilized in compressor or turbine blade deflection monitoring systems for steam or combustion industrial turbine engines. Image analysis of relative position of the blade within the monitoring system camera's field of view taken at one time at a blade rotation position is compared with one or more images taken at different times at the same blade rotation position during turbine engine operation. Changes of relative blade position within the same field of view orientation between successive temporal images (and/or optionally the rate of change of blade deflection between successive temporal images) are correlated with blade deflection by a blade deflection monitoring system (BDMS) controller. The controller alarms or trips the engine if monitored blade deflection falls outside permissible operation parameters.

Figure 1:
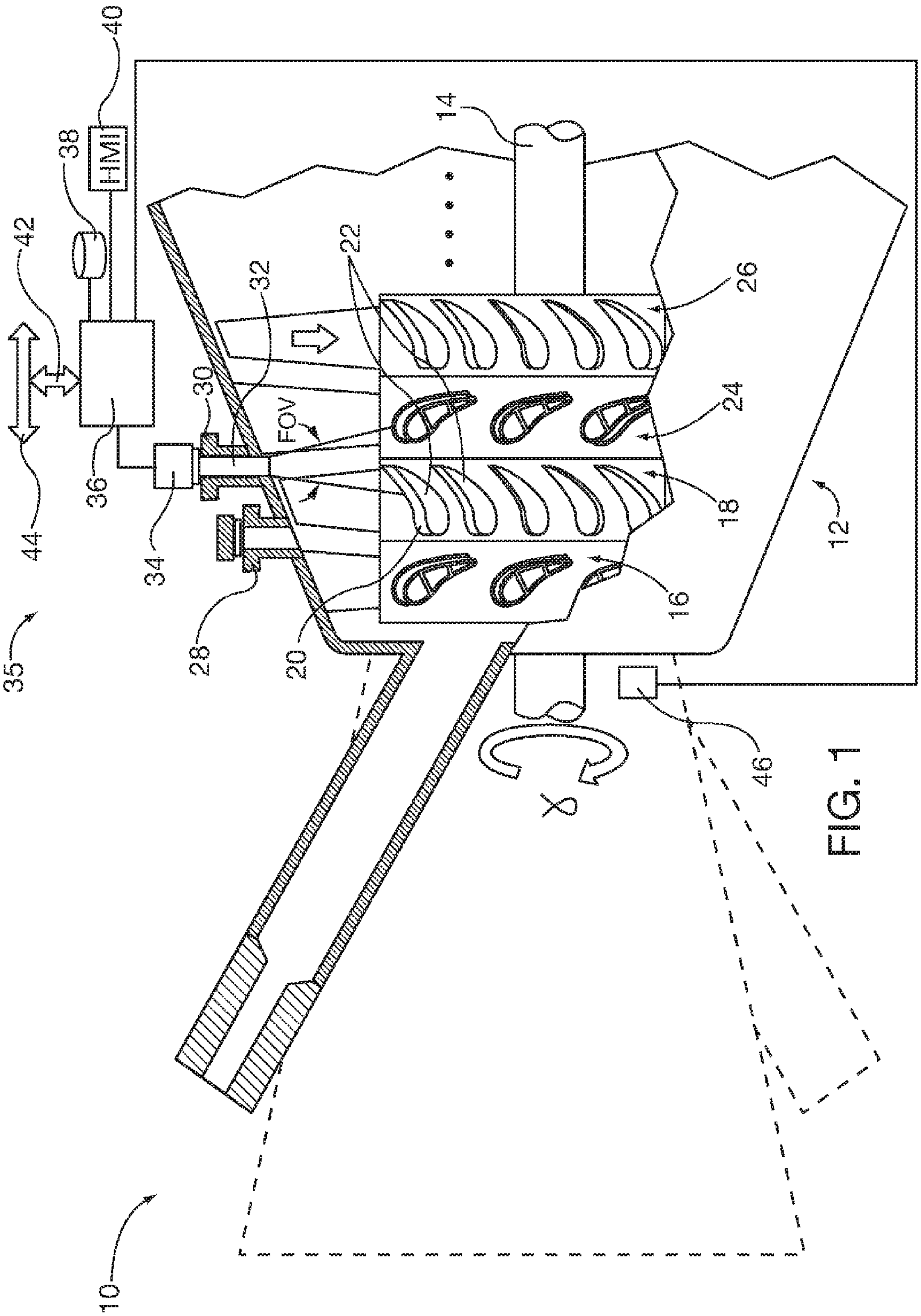
FIG. 1 is a schematic cross sectional view of an industrial combustion turbine engine incorporating and exemplary embodiment of the blade deflection monitoring system of the invention.

FIG. 1 shows a combustion or gas turbine engine 10, including a turbine section 12 and a rotating shaft 14 within the engine of known construction. Circumferential arrays of Row 1 vanes 16, Row 1 blades 18 (including a plurality of individual blades 20 and blade tips 22), and Row 2 vanes 24 and Row 2 blades 26 are affixed to the shaft 14. In operation the shaft 14 rotates at a constant speed $\gamma$. The turbine engine 10 includes a plurality of inspection ports 28, 32 of known construction that enable inspection of the turbine section 12 interior from outside the engine. Ports are often also affixed to the combustion and compressor sections of gas or combustion turbine engines. Inspection ports 28 and 30 are kept in sealed condition during turbine engine 10 operation, in order to isolate the high temperature engine interior from ambient air outside the engine. The inspection ports 28 and 30 facilitate selective insertion of monitoring and inspection devices into the engine 10 during engine operation, engine cooling after shut down in so-called "turning gear" mode and during engine service/repair outages. It is also noted that inspection ports are also often included in steam turbine engines.

Figure 2:
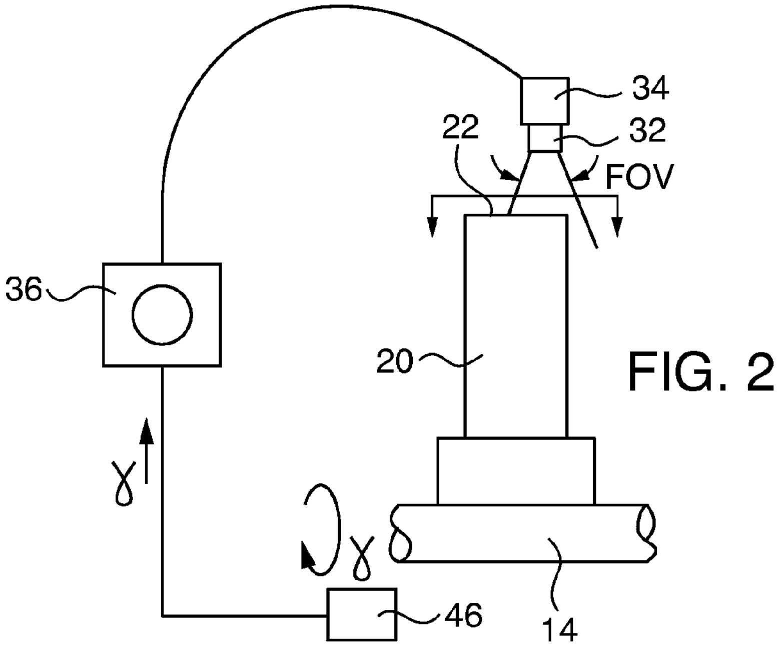
FIG. 2 is a schematic elevational view of the relative orientation between a turbine blade and the monitoring system optical camera field of view.

In FIGS. 1 and 2 a known optical tube 32, containing an array of high temperature resistant optical lenses (not shown) is inserted and retained in known fashion within the inspection port 30, so that a field of view (FOV) is established within the engine. Portions of the turbine blades 20, including their respective turbine blade tips 22 are visible within the FOV. Images of the blade tips 22 passing through the FOV are captured by externally mounted camera 34 that is optically coupled to the external distal end of the optical tube 32. An exemplary temperature resistant optical tube 32 is shown and described in United States Patent Publication No. 2013/0194379, published on Aug. 1, 2013, the entire contents of which is hereby incorporated by reference herein. In this way, only the relatively heat and harsh environment resistant optical tube 32 is exposed to the operating turbine engine 10 interior while the camera 34 is located outside the engine in a relatively less hostile environment.

The optical camera 34 captures optical, visible images in the infra-red and/or visible light spectra, and is preferably capable of capturing images at least at the blade rotational speed or multiples of the rotation speed. The camera 34 and optical tube 32 comprise parts of the blade deflection monitoring system (BDMS) 35 that also includes a BDMS controller 36 coupled to the camera, for storing captured camera images of blade tips 22 in the field of view (FOV) and for controlling the camera image capture sampling rate, so that the blade tip is at the same rotational position in each image. An exemplary BDMS controller 36 may comprise an industrial programmable logic controller (PLC), a processor based architecture personal computer or tablet computing device or a networked server that respectively execute program instruction sets for performing the BDMS 35 functions described herein. The camera 34 image capture sample rate and timing are designated by the BDMS controller 36 to generate a data set of temporal optical images captured at different sampling times for designated turbine blade tips 22 at the same rotational position. The camera 34 image capture sample rate can also be selected to generate respective data sets of temporal optical images captured at different sampling times for multiple respective designated turbine blade tips 22. Image data sets are generated and stored in the BDMS controller 36 and/or data storage device 38. An exemplary known human machine interface (HMI) 40, which may comprise a viewing monitor, keypad and/or mouse, allows operators to view one or more camera images, monitor the BDMS 35 operation, or reconfigure the BDMS. The BDMS controller 36 has a communications interface 42 for communicating with other known engine 10 and power plant monitoring and control systems, such as via data bus 44.

The BDMS controller 36 controls the camera 34 image capture sample rate and timing with assistance of shaft position/speed sensor 46. The sensor 46 determines rotational position of one or more blades and/or shaft 14 rotational speed $\gamma$ (such as in cooperation with a known shaft-mounted position encoder) and routes that sensor determined information directly or indirectly to the BDMS controller 36. The sensor 46 and/or the BDMS controller 36 are alternatively incorporated within the engine 10 general monitoring and control system (not shown) that is used to operate one or more engines in a power plant facility.

Figure 3:
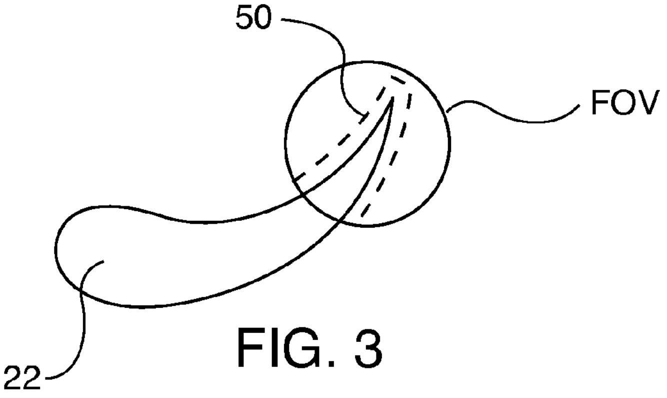
FIG. 3 is a captured image of a blade tip within the optical camera field of view of the monitoring system of FIG. 2, taken at a first sample capture time.
Figure 4:
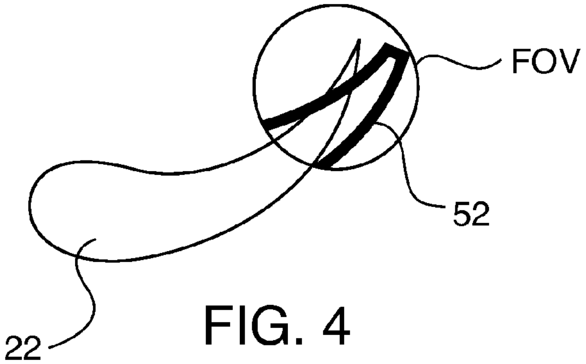
FIG. 4 is a captured image of a blade tip within the optical camera field of view of the monitoring system of FIG. 2, taken at a second sample capture time.

FIGS. 3 and 4 show respectively a data set image of a designated turbine blade tip 22 captured at successive sample times. The camera 34 field of view (FOV) remained fixed and generally circular for both the images of FIGS. 3 and 4. The BDMS controller 36 correlates relative change in the blade tip 22 position in the respective fields of view of two or more successive images. The greater shift in the blade tip 22 trailing edge image from FIG. 3 to FIG. 4 signifies that the blade tip 22 was deflected from the first sample time to the second sequential sample time. In FIG. 3, the blade tip 22 trailing edge captured in the image falls within a permissible blade tip deflection specification range signified by the dashed line 50. In FIG. 4 the blade tip 22 trailing edge has shifted outside a range of permissible blade deflection 52, causing the blade deflection monitoring system 35 to alarm or otherwise enunciate that blade deflection exceeds a permissible deflection range. In more extreme cases of blade deflection, the BDMS can commence engine trip to shut down further load on the engine. The BDMS controller 36 correlates a designated blade tip 22 changes in position within the camera image field of view between two or more sequential image samples with blade deflection amplitude.

The Blade deflection monitoring system 35 advantageously determines engine blade 20 deflection during online operation of the turbine engine 10. Placing heat and pressure sensitive camera 34 and other electronic components of the BDMS 35 outside the engine interior, with only a heat resistant optical tube within the engine, increases likelihood that the BDMS can monitor blade deflection throughout all or most of an engine's power generation service cycle without system failure. The optical tube 32 is insertable into existing engine 10 service ports 28, 30 or any other port that allows establishment of the camera 34 field of view within a sweep path of one or more blade 20 rows of interest.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for monitoring turbine blade deflection during turbine engine operation, comprising:

inserting an optical tube into an inspection port that is within a housing of a turbine section of a turbine engine, and coupling a fixed optical camera on an end of the optical tube that is outside the housing;

establishing with the optical camera a fixed, static field of view within the turbine section of the turbine engine that captures optical images of at least a portion of an outer periphery of a tip of a turbine blade at a designated rotational position of the turbine blade during engine shaft rotation;

establishing within the fixed, static field of view of the optical camera a maximum permissible boundary of the outer periphery of the turbine blade tip deflection range of motion at the designated blade rotational position;

determining shaft rotational speed of the turbine engine;

capturing optical images with the optical camera at the determined shaft rotational speed when the turbine blade is at the designated rotational position;

capturing a first image of the outer periphery of the tip of the turbine blade in the fixed, static field of view at the designated rotational position;

determining whether the position of the outer periphery of the tip of turbine blade in the first image is within the permissible boundary of the outer periphery of the turbine blade tip deflection range of motion;

capturing a second image of the turbine blade portion in the field of view at the same designated rotational position at a later time;

determining any change in relative position of the of outer periphery of the tip of the turbine blade within the static, fixed field of view of the optical camera between the first and second images;

correlating any determined change in relative position of the of outer periphery of the tip of the turbine blade within the static, fixed field of view between the first and second images with turbine blade deflection; and alarming if any portion of outer periphery of the tip of the turbine blade in the first or the second image is outside the permissible boundary of the outer periphery of the turbine blade tip range of motion.

2. The method of claim 1, the designated blade rotational position determined with a turbine shaft position/speed sensor.

3. The method of claim 1, further comprising:

capturing first and second different temporal images of respective outer peripheries of the tips of plural individual turbine blades with the camera;

for each respective individual blade outer periphery portion, determining its change in relative position within the fixed, static field of view of the optical camera between its respective first and second images; and for each respective individual blade outer periphery portion, correlating the determined change in the turbine blade outer periphery portion relative position with the turbine blade deflection.

4. The method of claim 1, further comprising capturing successive images of respective outer peripheries of tips of one or more turbine blades in the static, fixed field of view of the optical camera at the same designated rotational position.

5. The method of claim 4, further comprising correlating rate of change of relative position of the outer periphery of the tip of one or more of the turbine blades within the static, fixed field of view of the optical camera between the first and plural successive temporal images with rate of change of blade deflection of the respective blade and alarming if said respective rate of change exceeds an established permissible range of blade deflection rate of change.

6. The method of claim 4, the designated blade rotational position determined with a turbine shaft position/speed sensor.

7. An operating turbine engine blade deflection monitoring system, comprising:

an optical tube, having a first end for insertion into and coupling to an inspection port that is within a housing of a turbine section of a turbine engine, and a second end for remaining outside the housing;

an optical camera having a field of view, for coupling to the second end of the optical tube, so that its field of view captures fixed, static optical images of at least a portion of an outer periphery of a tip of a turbine blade at a designated rotational position of the turbine blade within the turbine engine during engine shaft rotation;

the camera capable of capturing a first image of the at least portion of the outer periphery of the tip of the turbine blade in the fixed, static field of view at the designated rotational position;

the camera capable of capturing a second image of the at least portion of the outer periphery of the tip of the turbine blade in the fixed, static field of view at the same designated rotational position at a later time;

a blade deflection monitoring system controller, coupled to the camera, for: establishing within the fixed, static field of view of the optical camera a maximum permissible boundary of the outer periphery of the turbine blade tip deflection range of motion at the designated blade rotational position;

receiving the first and second images and sequentially determining whether the respective position of the outer periphery of the tip of turbine blade in either of the first and second images is within the permissible boundary of the outer periphery of the turbine blade tip deflection range of motion;

alarming if any portion of outer periphery of the tip of the turbine blade in the first or second images is outside the permissible boundary of the outer periphery of the turbine blade tip range of motion;

determining any change in relative position of the outer periphery of the tip of the turbine blade within the static, fixed field of view of the optical camera between the first and second images;

correlating any determined change in relative position of the of outer periphery of the tip of the turbine blade within the static, fixed field of view with turbine blade deflection between the first and second images; and correlating any determined change in relative position of the of outer periphery of the tip of the turbine blade within the static, fixed field of view with turbine blade deflection.

8. The system of claim 7, the optical tube capable of continuous image generation during turbine engine operation.

9. The system of claim 7, further comprising:

the camera capturing first and second different temporal images respective outer peripheries of the tips of plural individual turbine blades;

the controller determining, for each respective individual blade outer periphery portion, blade portion change in relative position within the fixed, static field of view of the optical camera between its respective first and second images; and the controller correlating, for each respective individual blade outer periphery portion, determined change in relative position with the respective turbine blade deflection.

10. The system of claim 7, the controller capturing successive images of respective outer peripheries of tips of one or more turbine blades in the static, fixed field of view of the optical camera at the same designated rotational position.

11. The system of claim 10, the controller correlating rate of change of relative position of the outer periphery of the tip of one or more of the turbine blades within the static, fixed field of view of the optical camera between the first and plural successive temporal images with rate of change of blade deflection of the respective blade and alarming if said respective rate of change exceeds an established permissible range of blade deflection rate of change.

12. The system of claim 10, further comprising a turbine shaft position/speed sensor coupled to the controller, for determining designated blade rotational position.

13. The system of claim 7, the camera capturing optical images in infra-red or visible light spectral range.

14. The system of claim 13, the camera capable of capturing images at a sample rate equal to or multiples of blade rotational speed.

15. A turbine engine, comprising:

a housing defining an inspection port;

a rotating shaft in the housing, having an array of turbine blades; and a turbine engine blade deflection monitoring system, including:

an optical camera having a an optical tube, coupled to the inspection port, so that a fixed, static field of view through the optical tube generates images of at least a portion of an outer periphery of a tip of a turbine blade at a designated rotational position of the turbine blade within the turbine engine housing during engine shaft rotation, with image capture components of the camera remaining outside the engine;

the camera capable of capturing a first image of at least a portion of the outer periphery of the tip of the turbine blade in the fixed, static field of view at the designated rotational position;

the camera capable of capturing a second image of the at least a portion of the outer periphery of the tip of the turbine blade in the fixed, static field of view at the same designated rotational position at a later time;

a blade deflection monitoring system controller, coupled to the camera, for:

establishing within the fixed, static field of view of the optical camera a maximum permissible boundary of the outer periphery of the turbine blade tip deflection range of motion at the designated blade rotational position;

receiving the first and second images and sequentially determining whether the respective position of the outer periphery of the tip of turbine blade in either of the first and second images is within the permissible boundary of the outer periphery of the turbine blade tip deflection range of motion;

alarming if any portion of outer periphery of the tip of the turbine blade in the first or second images is outside the permissible boundary of the outer periphery of the turbine blade tip range of motion;

determining any change in relative position of the outer periphery of the tip of the turbine blade within the static, fixed field of view of the optical camera between the first and second images;

correlating any determined change in relative position of the of outer periphery of the tip of the turbine blade within the static, fixed field of view with turbine blade deflection between the first and second images; and correlating any determined change in relative position of the of outer periphery of the tip of the turbine blade within the static, fixed field of view with turbine blade deflection.

16. The engine of claim 15, further comprising:

the camera capturing first and second different temporal images respective outer peripheries of the tips of plural individual turbine blades;

the controller determining, for each respective individual blade outer periphery portion, blade portion change in relative position within the fixed, static field of view of the optical camera between its respective first and second images; and the controller correlating, for each respective individual blade outer periphery portion, determined change in relative position with the respective turbine blade deflection.

* * * * *